United States Patent [19]

Grundmann et al.

[11] 3,840,313

[45] Oct. 8, 1974

[54] MOLDING MACHINE CLAMP FORCE INDICATOR

[75] Inventors: Volker R. Grundmann, Glastonbury; Douglas C. Glazier, Sr., Windsor Locks, both of Conn.

[73] Assignee: Litton Industrial Products, Inc., Berlin, Conn.

[22] Filed: Nov. 1, 1972

[21] Appl. No.: 302,931

[52] U.S. Cl. .............................. 425/171, 425/451.5
[51] Int. Cl. .............................................. B29f 1/00
[58] Field of Search........ 425/167, 450 R, 171, 169, 425/154; 100/99

[56] References Cited
UNITED STATES PATENTS

| | | | |
|---|---|---|---|
| 2,670,626 | 3/1954 | Hall | 100/99 X |
| 3,345,691 | 10/1967 | Aoki | 425/171 |
| 3,642,405 | 2/1972 | Eggenberger et al. | 425/167 X |
| 3,728,057 | 4/1973 | Grundmann et al. | 425/169 X |

*Primary Examiner*—J. Spencer Overholser
*Assistant Examiner*—David S. Safran
*Attorney, Agent, or Firm*—Joseph R. Spalla

[57] ABSTRACT

A mechanism and method for predetermining the force imposed upon the mold in an injection-molding machine. The force applied to the mold in compression is equal to the tension force on the tie bars and produces a predictable elongation. By setting the mold height adjustment to a predetermined quantity slightly less than the true mold height, the operator predetermines the force applied to the mold. The increment of mold height adjustment from true mold height is selected by an indicator which includes a graduated circular plate which rotates with a tie bar nut adjacent to a stationary pointer. The angular displacement of the associated tie bar nut is a function of the desired predetermined force on the tire bars.

2 Claims, 6 Drawing Figures

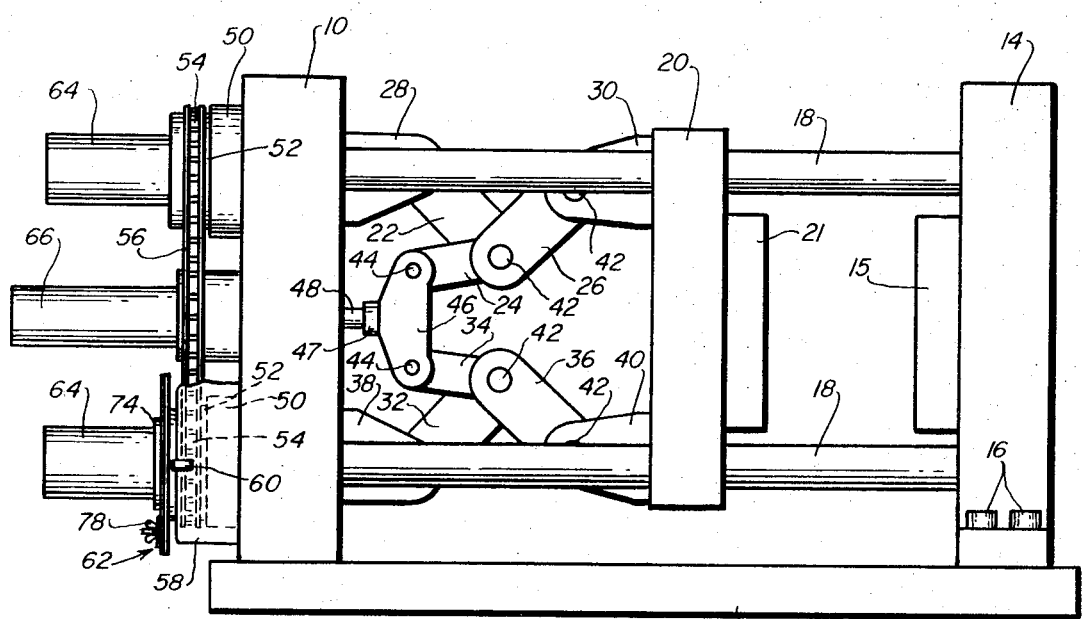
Fig_1
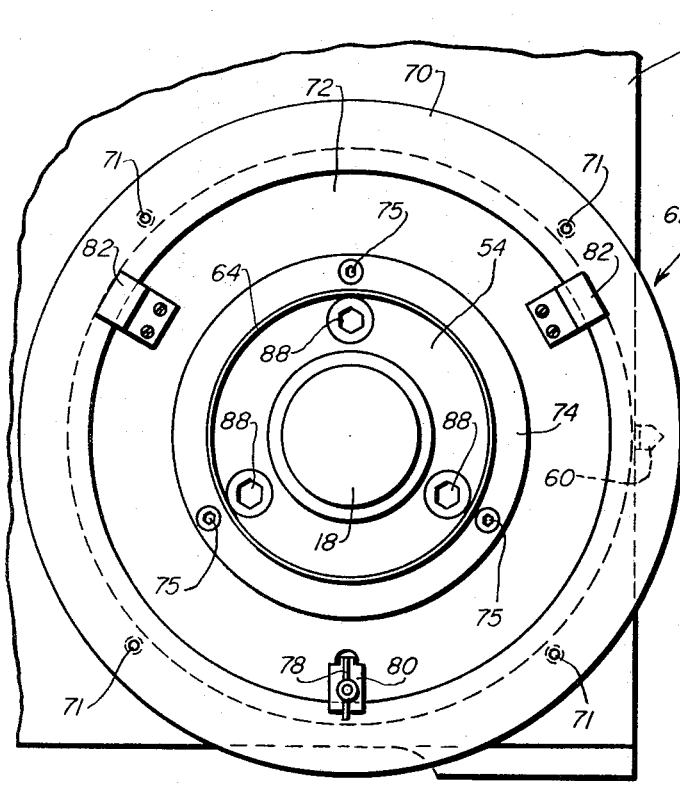
Fig_2
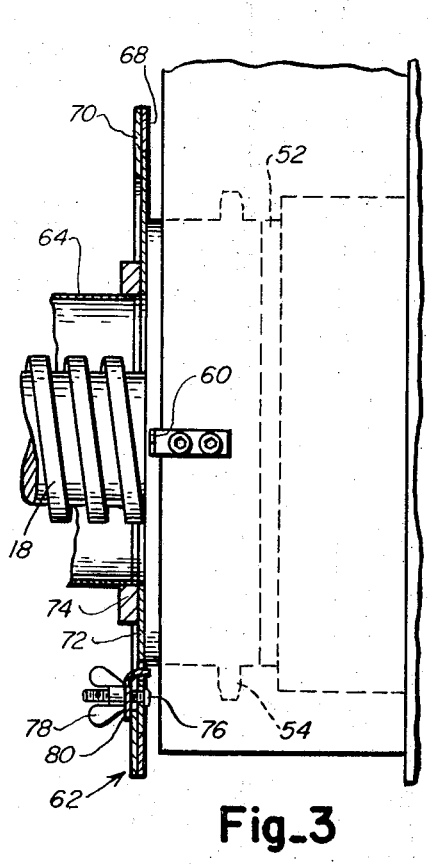
Fig_3

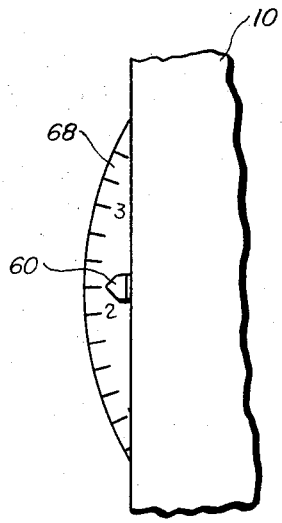
Fig_4
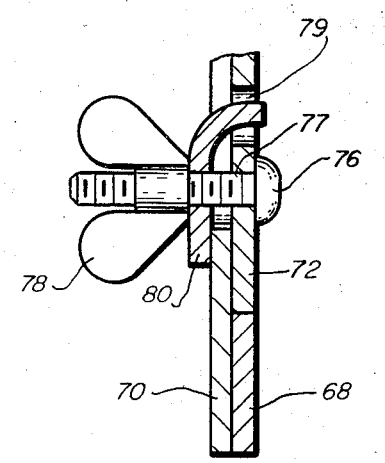
Fig_5
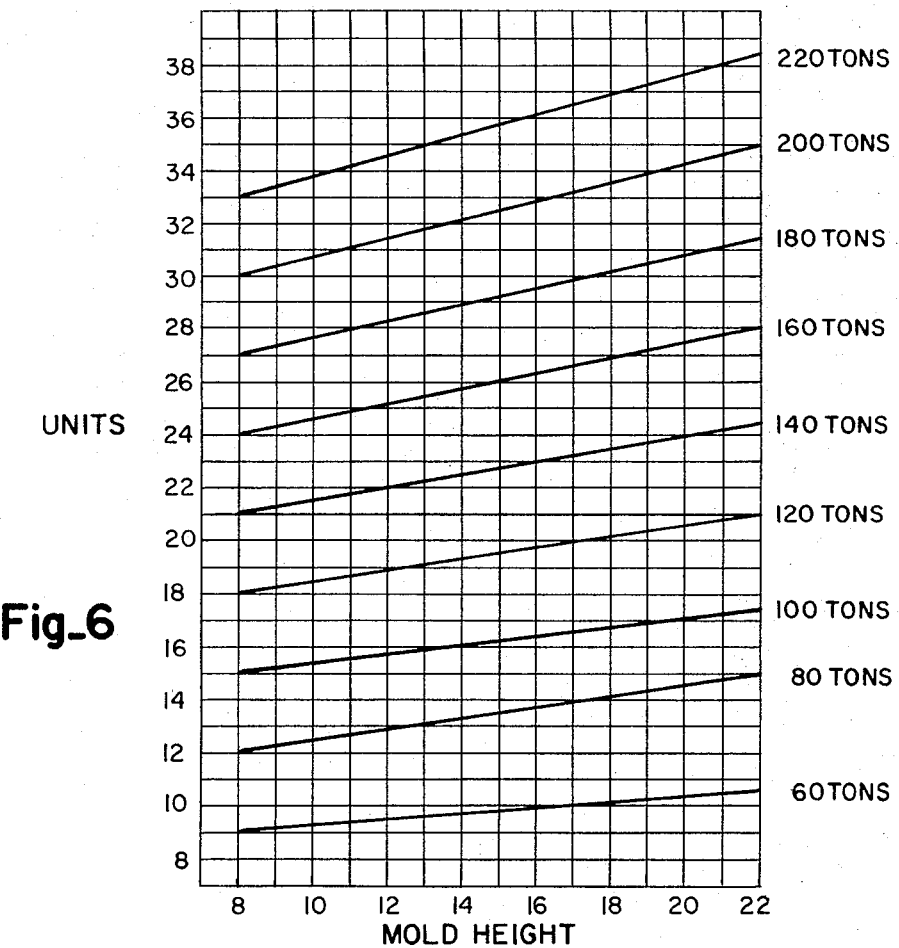
Fig_6

3,840,313

MOLDING MACHINE CLAMP FORCE INDICATOR

BACKGROUND OF THE INVENTION

This invention relates in general to new and useful improvements in injection-molding machines and particularly to a mechanism for determining the force applied by the clamp mechanism which forces the mold portions together. It is desirable in such machines to know the forces which are applied to the mold. Too great a force would result in damage to the mold. Too small a force would result in "flashing"wherein after the melt is injected into the mold cavity seepage occurs between the halves of the mold. Various mechanisms have been known in the prior art for sensing the travel of the stationary platen in respect to the movable platen. Such mechanisms do not provide the force data which is necessary to avoid crushing and flashing problems referred to above. The prior art has also included mechanisms embodying strain gauges. Such devices are inherently delicate as well as being expensive particularly since sophisticated display equipment is necessary to utilize the data supplied by a strain gauge. The forces involved are often more than fifty tons, and accordingly, many traditional force measuring devices are not suitable.

SUMMARY OF THE INVENTION

It has now been found that the problems with the prior art and the objects of the invention can be readily attained in an injection-molding machine assembly having a base with a generally planar upper surface. Disposed thereon is a stationary platen fixed to the generally planar upper surface of the base and a clamp housing member carried on the generally planar upper surface of the base for movement toward and away from the stationary platen. A movable platen member is mounted between the stationary platen and the clamp housing member on the upper surface of the base for movement toward and away from the clamp housing member a predetermined mold closing distance. Means are provided for moving the clamp housing member toward and away from the stationary platen; as well as means for moving the movable platen away from the clamp housing member. In its prefered aspect, the injection-molding machine means for moving the movable platen away from the clamp housing member a fixed predetermined distance will include a hydraulic cylinder having a piston therein. The maximum travel of the piston will be limited by one end of the cylinder whereby the maximum distance of the platen away from the clamp housing member will be predetermined. The means for moving the clamp housing member toward and away from the stationary platen will comprise a plurality of tie bars fixed to the stationary platen at one end and threaded at the other end thereof. The tie bars will pass through a corresponding number of passageways in both the movable platen and the clamp housing member and the passageways will slidingly engage the tie bars which are provided with a tie bar nut engaging each threaded end. Means are also provided for measuring the travel of the clamp housing member from a reference point located a distance from the stationary platen determined by just touching contact of mold halves carried by the stationary and movable platens when the movable platen is moved to close the mold. The distance of travel of the clamp housing from the reference point determining mold clamp force. The means for measuring the travel of the clamp housing member from a predetermined reference point most preferably includes means for determining the angular displacement of one tie bar nut which causes the motion of the clamp housing member along the upper surface of the base. In one form, the means for determining the angular displacement of one tie bar nut comprises a circular graduated indicator concentrically carried on one of the tie bar nut sprockets. In one form, one of the tie bar nut sprockets will have affixed thereto a circular plate concentrically mounted which will support the graduated circular indicator which is mounted for angular indexing with respect to the plate.

The invention also contemplates the method of predetermining the clamp force of an injection-molding machine having a clamp housing member, a reciprocable compression mechanism for clamping a mold and a mold height adjustment. The method steps include: adjusting the mold height so that the mold halves do not touch when the compression mechanism is extended, extending the compression mechanism to its maximum travel, decreasing the mold height adjustment until the mold halves are in contact thus to define a reference point, retacting the compression mechanism, moving the clamp housing member in a direction from the reference point which increases compression mechanism or mold clamp force an amount corresponding to the elongation of the tie bars which will result from applying the desired predetermined force to the mold when the compression mechanism is closed, and closing the compression mechanism on the mold preparatory to an injection cycle.

It is an object of the invention to provide a simple, inexpensive method of predetermining the force to be imposed across the mold.

It is a further object to eliminate the use of delicate apparatus which would be subject to malfunction and to utilize the existing machine structure to as great an extend as possible.

BRIEF DESCRIPTION OF THE DRAWING

FIG. 1 is a front elevational view of a plastic molding machine embodying the present invention and showing the clamp mechanism in the open position;

FIG. 2 is a broken-away side elevational view to an enlarged scale of the annular graduated member which together with the pointer shown in phantom constitutes the visible indication of the force being applied;

FIG. 3 is a detailed broken-away view in partial section and to an enlarged scale of the apparatus shown in FIG. 2;

FIG. 4 is a detailed broken-away enlarged scale view of the annular graduated member and associated pointer as viewed by an operator standing in front of the stationary and movable platens and looking to his left;

FIG. 5 is a detailed sectional broken-away view to a greater enlarged scale showing the mounting bracket by which the annular graduated member is secured to a disc which is in turn affixed to a tie bar unit;

FIG. 6 is a nomograph which the operator of the force indicator utilizes to determine a clamp force for a given mold height and abstract number indication on the annular graduated member.

DESCRIPTION OF THE PREFERRED EMBODIMENT

Turning now in detail to the attached drawing there is illustrated in FIG. 1 an injection-molding machine having a mold or clamp housing 10 which is carried for rectilinear sliding motion on a pad or base 12. Also carried by the stationary base 12 and fixedly attached thereto is a stationary platen 14 secured by bolts 16, 16. A plurality of tie bars 18, 18 which will most commonly number four fixedly engage the stationary platen 14 and are carried in sliding engagement within individual passageways (not shown) in clamp housing member 10. These passageways in the clamp housing member 10 are disposed with their longitudinal axis in aligned relationship with the tie bars 18 to accommodate their axial movement.

The tie bars 18, 18 which are disposed in parallel relationship also pass through individual aligned passageways (not shown) in a movable platen 20 which is also mounted for sliding engagement with base 12. The movement of movable platen 20 with respect to clamp housing member 10 is accomplished in the embodiment shown by means of a toggle linkage comprising upper link 22, upper left center link 24 and upper right link 26. These links are carried by upper left lug 28 and upper right lug 30. The linkage further includes lower left link 32, lower center link 34, and lower right link 36 which are carried by lower left lug 38 and lower right lug 40. All of the upper links 22, 24, 26 are joined by a single pin 42 in pivoting relationship about one end of the elongated extent thereof. Similarly, another pin 42 joins each of the lower links 32, 34, 36 in pivoting relationship at one end of the elongated extent of each of these members. Similarly, the other extremities of upper right link 26 and lower right link 36 are joined respectively by other pins 42, 42 to the upper right lug 30 and the lower right lug 40. In a similar manner upper left link 22 and lower left link 32 are joined respectively to upper left lug 28 and lower left lug 38. The pins making these connections are not visible in FIG. 1 because of their location behind the tie bars 18. The distal extremities of elongated links 24 and 34 which are joined by pins 42, 42 are joined by pins 44, 44 to a yoke 46. The yoke 46 is in turn secured by a ring 47 to a piston rod 48.

Disposed to the left of clamp housing 10 as viewed in FIG. 1 are support means 50, 50. This support means is of the type claimed in assignee's application Ser. No. 130,913, filed Apr. 5, 1971, now U.S. Pat. No. 3,756,757 and each has the function of carrying a sprocket 54 carried on a plurality of tie bar nuts 52, 52 which are internally threaded and engaged cooperatively dimensioned external threads on the exterior surface of the tie bar 18, 18 ends which extend to the left of the clamp housing member 10. The tie bar nuts 52 are carried by each tie bar 18 and each carries a sprocket 54 in fixed relationship. The sprockets are joined by a chain 56 driven by a relatively low power electric or hydraulic motor (not shown). The hydraulic motor is operated to drive the chain, and, accordingly, the sprockets 54 and the tie bar nuts 52. The rotation of the tie bar nuts 52 forces the clamp housing member 10 either toward or away from stationary platen 14 depending upon the direction of rotation.

Broken away in FIG. 1 is a stationary cover 58 carried by the clamp housing member 10 and which in turn carries a stationary pointer 60. The cover 58 is provided to prevent personnel injury and to keep dirt away from the chain 56 and sprocket 54 drive assembly. Mounted on one of the lower of the two lowermost sprockets 54, 54 is a plate assembly 62 which in the preferred embodiment is the means by which the operator preselects the force to be applied by the hydraulically operated toggle or clamp assembly to mold halves 21 and 15.

Cylindrical covers 64, 64 are provided to cover the left end of tie bars 18, 18 and to protect the tie bars from dirt which might otherwise enter into the roots of the thread ends thereof. Essentially at the center of clamp housing member 10 is cylinder 66 fixedly attached thereto and having an internal piston (not shown). The piston is connected to the piston rod 48 which is free to move axially in a passageway (not shown) through clamp housing member 10.

The plate assembly 62 is shown in greater detail in FIGS. 2, 3, 4 and 5. More particularly, the assembly includes a graduated generally planar annular member 68 which is fixed to a second generally planar annular member 70. The two members 68, 70 are fixed together by rivets or screws 71, 71, 71. As is shown best in FIG. 3, the outer diameters of the two members 68, 70 are equal and the inner diameter of backup member 70 is less than that of graduated member 68. This laminar assembly engages a bearing disc or plate 72 which is secured to one of the lower sprockets 54 by bolts 75 which extent through flanges or retainers 74 formed on the covers 64 as shown in FIG. 2. secured by a retainer 74 to one of the lower sprockets 54. As will be most apparent from FIG. 5, the overlapping relationship of the members 68, 70 with the plate 72 allows for easy angular indexing of the members 68 and 70 with respect to plate 72. The angular relationship between the members 68, 70, and plate 72 is secured by means of bolt 76, a wing nut 78, and a generally "L" shaped member 80, as well as two retainers 82, 82. Two apertures 77, 79 are provided in disc 72 for respectively bolt 76 and the generally "L" shaped member 80 to provide the necessary locking action. As viewed in FIG. 3 retainers 82 secured to disc 72 "step" shaped to accomodate the face of backup member 70 in one plane and the face of plate 72 in another plane. The intervening right angle step provides a locating reference for the inside surface of backup ring 70. Three socket head bolts 88, 88, 88 serve to secure sprocket 54 to tie bar nut 52.

In operation, the invention utilizes the proposition that deformation of a member is equal to the imposed load times the length of the member involved divided by the product of the cross-sectional area being loaded times Young's modulus for the material being stressed. Allowance must be made for compression of certain machine members which tend to counteract the elongation of the tie bars. Empirical methods are ordinarily used to determine this allowance. It will be understood that when the four tie bars 18 are in tension the mold halves 21, 15 will be in compression. In setting up the machine, the mold halves 15, 21 carried respectively on stationary platen 14 and movable platen 20 are placed in abutting relationship with the toggle links 22, 26, 32 and 36 in the extended position. It will be understood that the limit of travel of the links 22, 26, 32 and 36 is determined by the maximum stroke of the piston in cylinder 66 and also that the view in FIG. 1 shows the piston in cylinder 66 retracted and the links 22, 26, 32 and 36 collapsed.

The application of hydraulic pressure to the left side of the cylinder as viewed will result in the piston being urged to the rightmost possible position. The power of this piston and cylinder is such that it will elastically deform even the relatively massive tie bars and it is the elongation of these tie bars which is relied on to provide an indication of the load being imposed.

The operator will normally displace the clamp housing member to a position to the left as viewed in FIG. 1 by means of the tie bar nuts which are driven by the electric or hydraulic motor (not shown). Hydraulic pressure is then applied to the lefthand side of cylinder 66 to displace the piston therein to the right as viewed and thereby force the toggle links 22, 26, 32 and 36 from the position shown to the extended position. Accordingly, movable platen 20 will be displaced to the right in an amount determined by the maximum permissible travel of the piston within cylinder 66 and the geometry of the toggle linkage. The tie bar nuts 52 are then rotated to urge the clamp housing member to the right until there is contact between the mold halves 21 and 15. As soon as there is contact, the drive for the chain 56 will stall because of its relatively light duty capability compared to the massive size of the tie bars 18 and the rest of the injection-molding machine. The operator will then index member 68 angularly about plate 72 to a position where the pointer 60 is aligned with a reference point on the calibrated member 68. Ordinarily, this reference point would be zero on the graduated scale thereof.

Next, hydraulic pressure is applied to the righthand side of the piston within cylinder 66 causing the toggle linkage to collapse and the withdrawal of mold half 21 away from mold half 15. Thereupon, the tie bar nuts 52 are rotated to displace clamp housing member 10 towards stationary platen 14 an amount equal to the deformation or elongation which is calculated using the above referred to equation given a desired mold compression force. Since the machine may be used with various molds having different heights, i.e., the horizontal distance between the sides of the movable and stationary platens when the mold is being compressed, it is necessary that consideration be given to the length of the tie bars under stress. More specifically, a mold height adjustment of the machine by means of rotating the tie bar nuts 52 varies the length under stress and Young's modulus is by definition related to a particular unit of length. The length under stress is equal to the distance from the nut 52 to the stationary platen 14.

In practice, it is most convenient to calculate the elongation involved by use of a nomograph as shown in FIG. 6. This nomograph, for a given mold height and given tonnage requirement, will determine the abstract number indication (units) which should appear on graduated member 68 when the tie bar nuts 52 have been rotated toward the stationary platen after the toggle linkage has been collapsed. It has been found that for a typical machine the amount of deformation involved and the pitch of the threads on the tie bars 18 that less than 360° of angular displacement of tie bar nuts is necessary to preselect the desired force. The abstract numbers have been utilized merely for operator convenience and to avoid confusing an operator with details which are not important to him. It will also be seen that on subsequent operation of the clamp with the same settings, the force developed across the mold halves 21 and 15 will be predetermined and will be the same in subsequent cycles because the piston within cylinder 66 will always return to its same position, and, accordingly, the toggle links 22, 24, 26, 32, 34 and 36 will always go to the same position, and, therefore, because of the massive power of the mechanism, the tie bars will be elastically elongated a predetermined amount corresponding to the desired force.

As will be appreciated, the means for measuring the travel of the clamp housing member from a reference may differ from that illustrated herein. Although the specific embodiment so described is particularly preferred because it utilizes the existing machine structure with a minimum of additional parts and is inherently reliable, various other distance measuring equipment could be used. Such equipment could be mechanical or electrical in nature and even laser measuring means could be utilized to measure the displacement. The machine structure may vary, particularly with regard to the relative placement of the movable and stationary platens and the clamp housing. Similarly, the number of tie bars may be more or less than four and the means for moving may be one or more hydraulic cylinders, either with or without some form of toggle linkage. The toggle linkage may also vary as is well known in the molding industry. Similarly, it is possible to change the injection-molding machine structure without departing from the invention. For example, the stationary platen may be disposed between the clamp housing member and the movable platen with tie bars sliding through the stationary platen. In a like manner, the invention may be used with both vertical and horizontal machines. It will also be understood that the apparatus described herein, while having particular relevance to injection-molding means, is also suitable for other machines including die casting machines.

Thus, it can be seen that the present invention provides a novel injection-molding machine and method whereby the forces applied to a mold may be controlled to avoid either damage to the mold or flashing at the mold parting surface. It is further apparent that the structure of the Applicants' invention is simple and economical to construct and assemble, and as a result of its inherent simplicity, is quite capable of long-lived operation.

We claim:

1. An inection molding machine comprising:
   a base member,
   a stationary platen carrying a mold half secured to said base member,
   a clamp housing member slidably supported on said base member for movement relative to said stationary platen,
   a movable platen carrying a mold half slidably supported on said base member,
   means connecting said clamp housing and movable platen operable to move said movable platen relative to said clamp housing member from a mold open position to a mold closed position,
   mold height adjusting means for moving said clamp housing and said movable platen as a unit relative to said stationary platen, said means comprising tie rods secured at one end to one of said platens and threaded at the other end thereof, passageways in said clamp housing and the other of said platens to slidably receive said tie bars, tie bar nuts engaging each threaded tie bar end, and tie bar nut drive means operable to rotate said tie bar nuts to vary the distance between said clamp housing and said stationary platen, a pointer on said clamp housing, indexable indicator means releasably locked to one of said tie bar nut drive means, means for releasing said indicator means for movement relative to said tie bar nut drive means to a reference position after said movable platen has been moved to a mold closed position and said clamp housing has ben moved to bring said mold halves into just touching contact, and means for operating said tie bar nut drive means in a direction to move said clamp housing toward said stationary platen after said movable platen has been moved to mold open position until said indicator has moved from said reference a predetermined number of degrees representing a desired clamping force when the mold is closed during injection cycles.

2. An injection molding machine as recited in claim 1, wherein said tie rods are secured to said stationary platen.

* * * * *